UNITED STATES PATENT OFFICE.

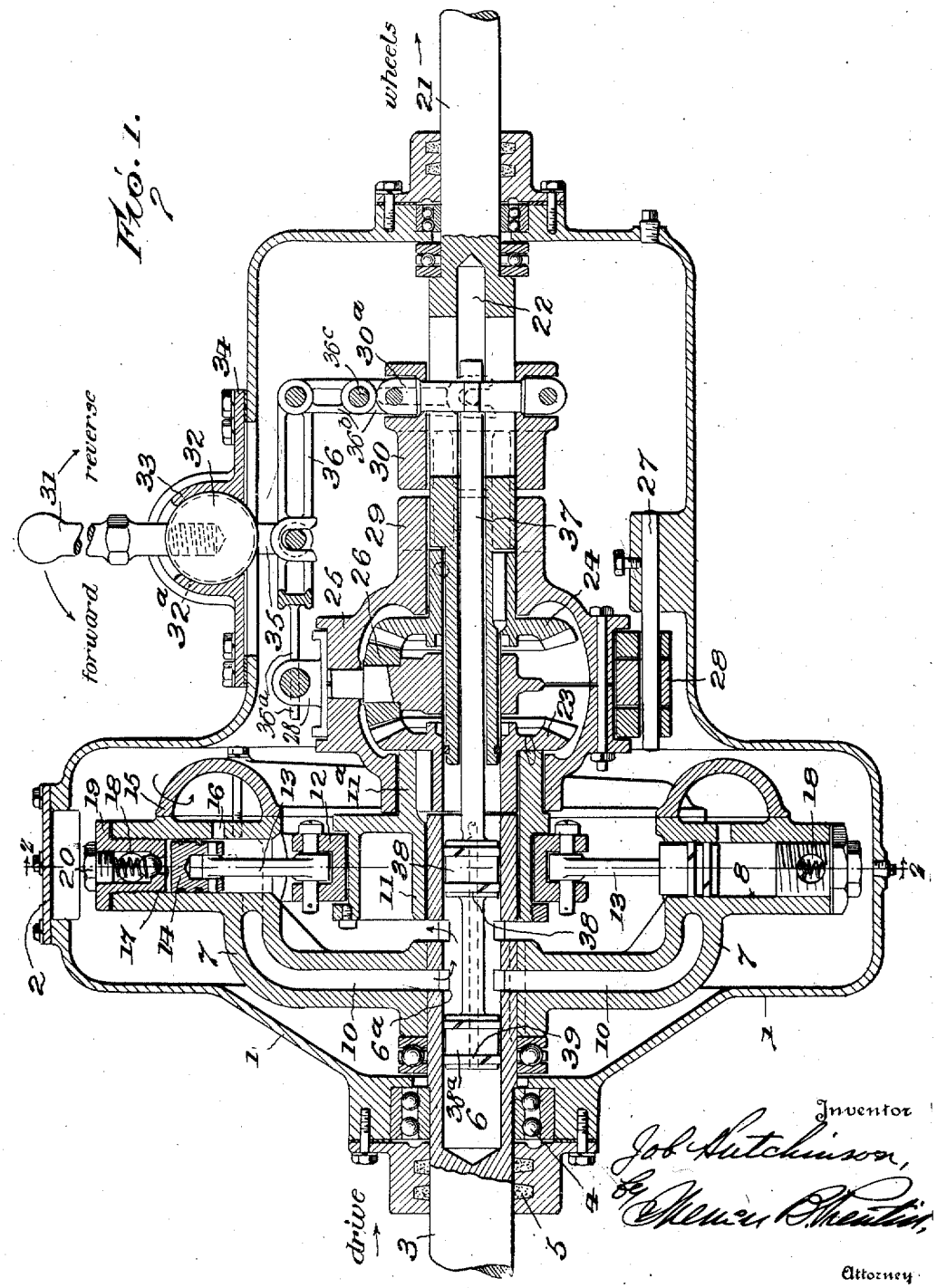

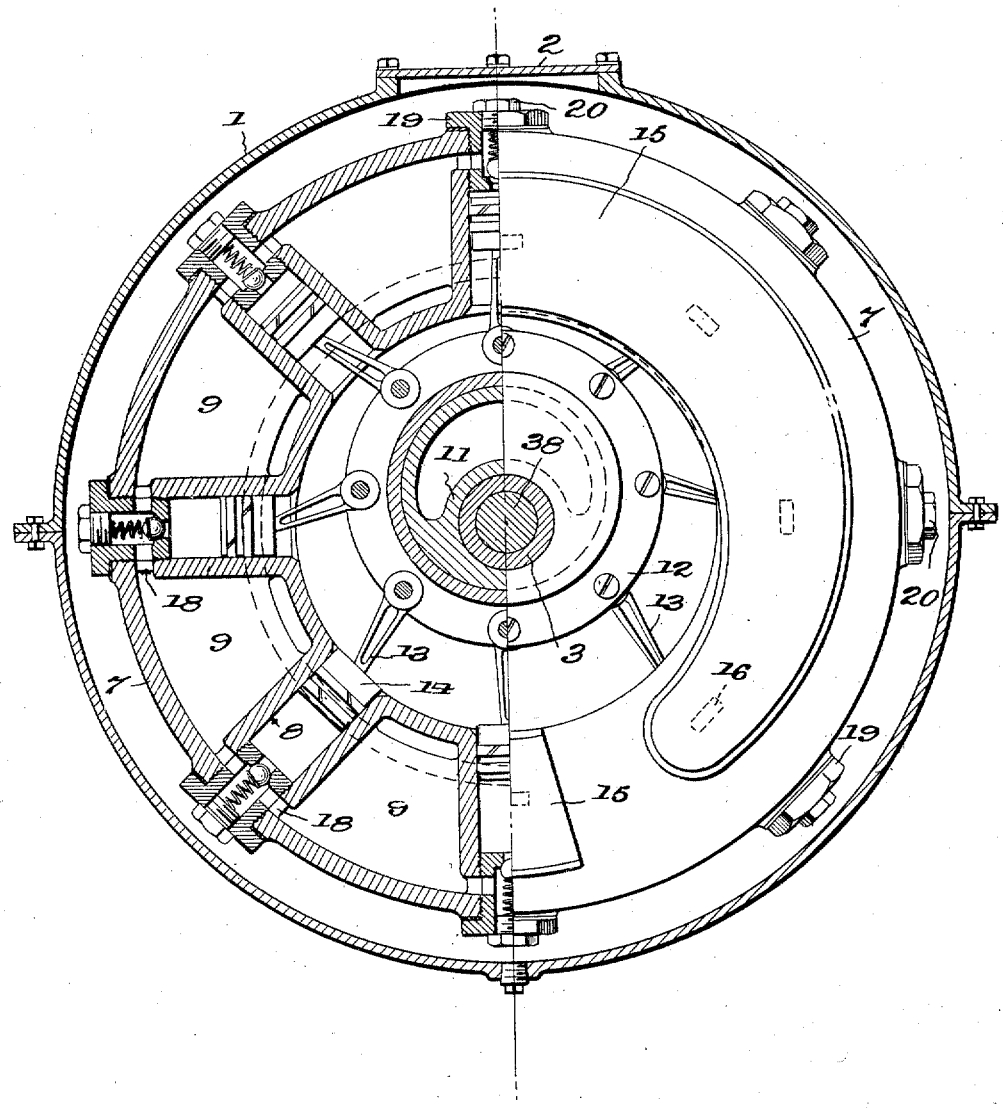

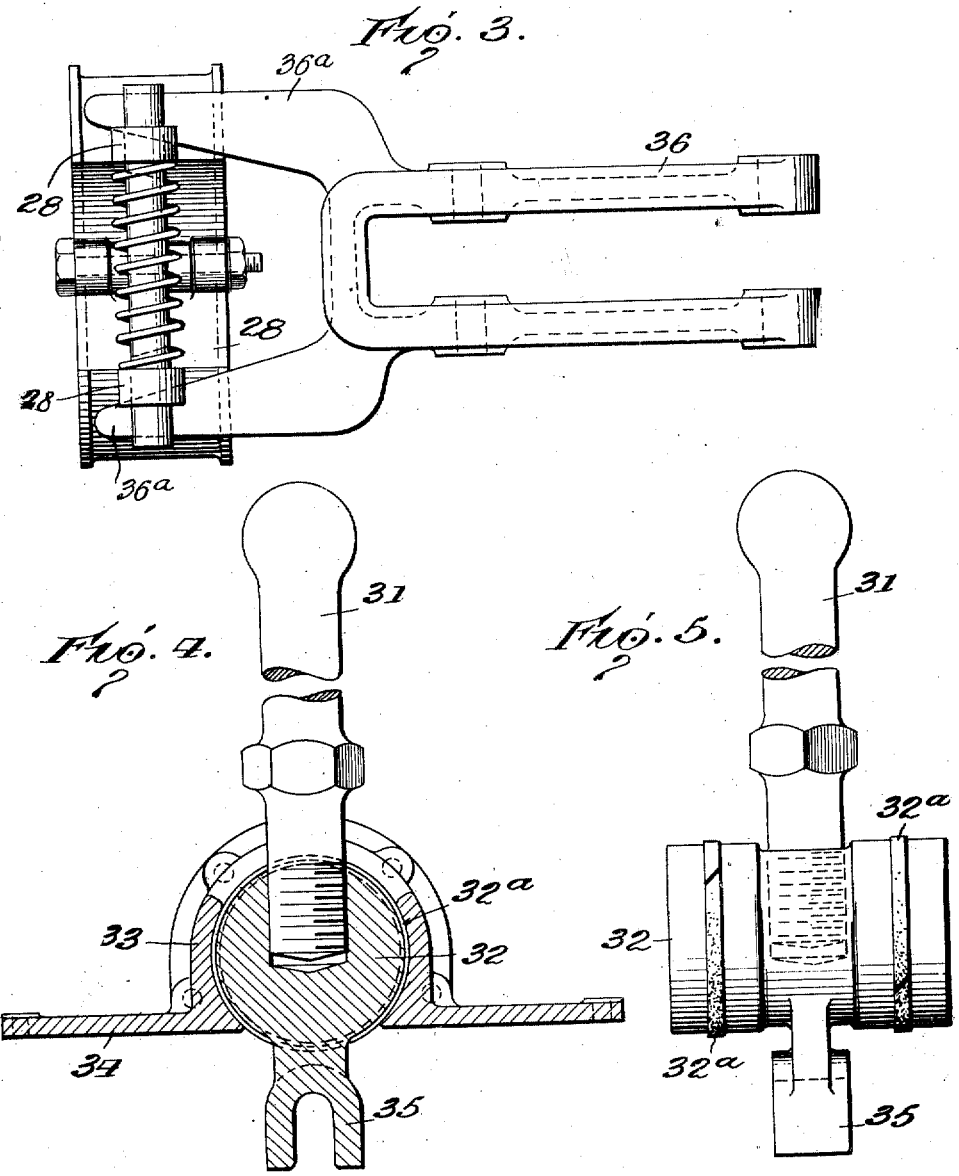

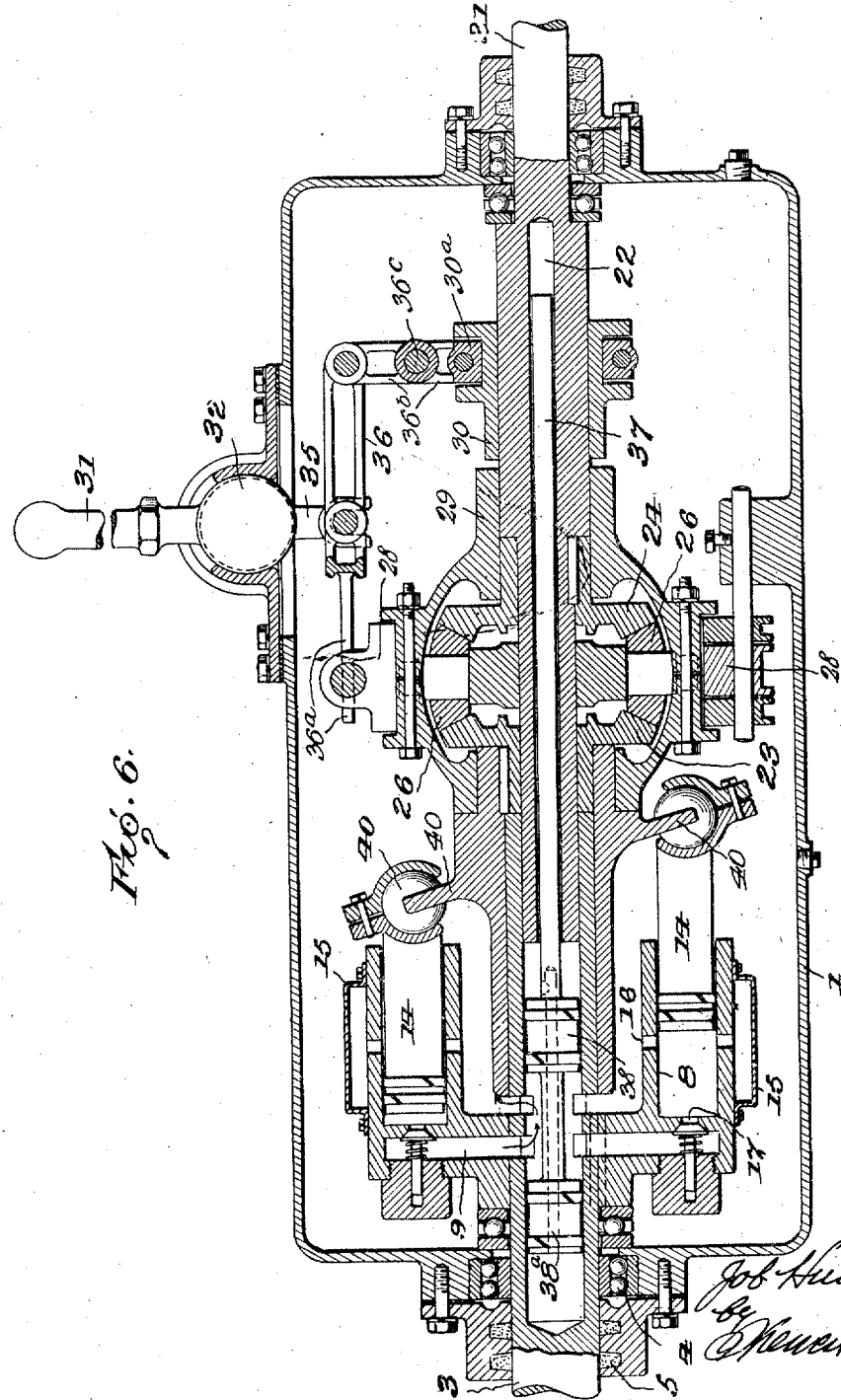

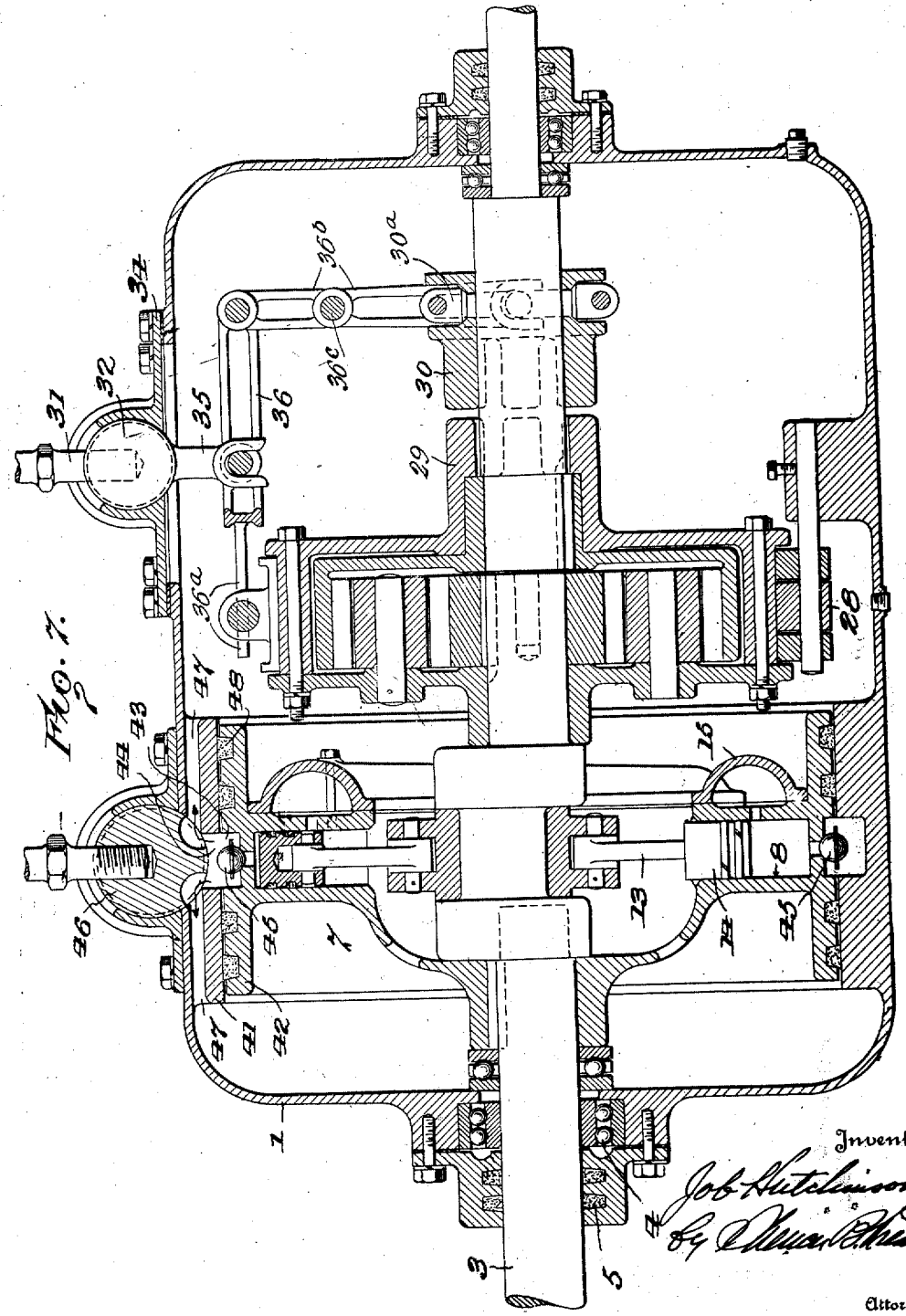

JOB HUTCHINSON, OF ASTORIA, NEW YORK.

VARIABLE-TRANSMISSION MECHANISM.

1,259,102.   Specification of Letters Patent.   Patented Mar. 12, 1918.

Application filed August 7, 1916. Serial No. 113,540.

*To all whom it may concern:*

Be it known that I, JOB HUTCHINSON, a citizen of the United States, residing at Astoria, in the county of Queens and State of New York, have invented new and useful Improvements in Variable-Transmission Mechanism, of which the following is a specification.

This invention relates to speed varying transmission mechanism in general and pertains particularly to apparatus designed to be used in automobiles and take the place of the gearing structures now in use. This transmission may be used where it is advisable to replace the present gear-sets and where the use of gears is impractical and where it is difficult to regulate the speed of the machine on which the mechanism is used. The change of speeds is accomplished by throttling the flow of liquid maintained under pressure by one or more small pistons in a cylinder or cylinders acting as pumps.

The invention includes the use of a fluid tight casing designed to be mounted rigidly on the frame of an automobile or other supporting structure. The apparatus contained within the casing includes suitable pumps and valve means for controlling the flow of fluid under the action of these pumps.

One object of the invention is to provide a unitary structure which will be rigid and which will include the piston cylinders together with their inner connecting compression chambers in a single annular member.

Another object of the invention includes the combination of the pumping pistons and the unitary annular member together with simple and compact means for effecting a change in the direction of application of the power from one shaft to another.

A further object of the invention includes the specific mechanism for placing the apparatus in its neutral position or in the forward or reverse position.

A further object of the invention includes the specific form of the control valve, the leak proof connection for the control handle and the specific mounting of the control apparatus on the casing.

Other objects of the invention together with the details of construction will be explained in detail in the following specification and claims and illustrated in the accompanying drawings in which Figure 1 represents a vertical section taken axially of the transmission. This view shows the shafts at opposite sides of the casing together with the pumping mechanism and control means.

Fig. 2 is a partial section taken on the line 2—2 of Fig. 1, looking in the direction of the arrow in Fig. 1. This view shows the relative spacing of the radially arranged cylinders and the scoop or funnel for diverting the fluid medium into the inlet port of the cylinders.

Fig. 3 is a top plan view of the link and brake for operating the clutch collar.

Fig. 4 represents the control valve operating handle in the leak proof cylindrical oscillating unit. The piston rings are shown in position for preventing the flow of fluid out of the casing.

Fig. 5 is a view of the control handle and the oscillating piston for use in the cylindrical chamber.

Fig. 6 is a vertical sectional view taken axially of a modification of the transmission mechanism in which the cylinders are arranged about the axis parallel thereto instead of radially as in Fig. 1.

Fig. 7 is another arrangement of the cylinders in which the casing has an inner cylindrical wall arranged to receive an annular rim carried by the cylinders. This view illustrates a modification of the gearing used for effecting a reverse movement of the shaft.

Fig. 8 is the ball valve assembly as shown in Fig. 7.

This gearless transmission includes the main casing arranged to be fastened to the frame of an automobile and includes a series of pumps within the casing. Fluid, preferably a light engine oil, substantially fills the interior of the casing and is compressed within a closed chamber by the action of the pumps. When the control handle is in the neutral position the pumps are idle but on the movement of the control handle in one direction the pumps are caused to rotate with the cylinders and compress oil within the closed chamber. A further movement of the handle in the same direction regulates a piston valve and the flow of the oil from the compression chamber to the escape into the main reservoir or casing. A reverse movement of the control handle causes the same operation of the pumps and a reverse movement of the driven shaft.

Referring in detail to the structure 1 indicates the main casing or fluid reservoir which is provided with an upper closure 2 for access and the insertion of oil. A drive shaft 3 projects into the interior of the casing and is provided with suitable bearings 4 in the casing wall. Felt oil rings 5 are provided to prevent the escape of oil along the drive shaft. That portion of the shaft 3 extending within the casing is provided with an axial bore 6 the purpose of which will be hereinafter explained. An annular casting 7 is rigidly keyed to the shaft 3 and comprises a unitary structure within which are formed the piston cylinders 8 and the annular compression chamber 9 between said pistons. The peripheral walls of this annular member 7 are continuous and arranged to be as nearly circular as possible in order to prevent the churning of the oil when the member is rotated. Within the same casting 7 there is a communicating passage or annular chamber 10 which leads from the compression chamber 9 to the bore of the shaft 3 which is provided with openings $6^a$ in registry with the passage 10. Loosely mounted on the shaft 3 and in alinement with the cylinders is an eccentric 11 and loosely mounted on eccentric 11 is an ecentric ring 12 to which are connected the connecting rods 13 for pistons 14. Fastened to the side wall of the annular member 7 is a scoop shaped or funnel-like member 15 which extends approximately half way around the annular member 7 and is designed to collect oil or other fluid medium and feed the same into the inlet ports 16 of the piston cylinders. The outlet ports of the cylinders are controlled by yielding ball valves 17. These outlet ports are connected to the compression chamber by the narrow passage ways 18. A bushing 19 seals the end of the cylinder and is provided with a plug 20 for retaining the ball valve and its spring in position.

A second or driven shaft 21 projects from the opposite side of the casing inwardly and in alinement with the shaft 3. This shaft 21 also is provided with an axial bore 22 as will be described. The eccentric 11 has an extension $11^a$ to which is rigidly keyed a primary gear or driving gear 23. Rigidly keyed to the shaft 21 and opposite to the gear 23 is a secondary gear or driven gear 24. Loosely mounted on the extension $11^a$ and on the shaft 21 is a spider or annular member 25 which rotates freely on the extension $11^a$ and the shaft 21 and provides a support for the pinions 26 which constitute intermediate gears between the drive gear 23 and the driven gear 24. Mounted on the interior of the casing is an adjustable rod 27 which supports the two halves of a friction brake band 28 designed to engage and hold stationary the bearing member 25. On one end of the member 25 there is provided a clutch having teeth 29 adapted to receive corresponding clutch members having teeth 30 slidably mounted on the transmission shaft 21 but arranged to rotate therewith. The contour of the teeth is indicated in dotted lines in Fig. 1.

The control of the apparatus includes a single lever 31 mounted on the exterior of the casing on a rocker shaft 32 located within the cylindrical walls 33, the flanges 34 of which are securely fastened to the casing. An extension from the shaft 32 projects inwardly as an arm 35 arranged to engage with the connection 36 which is provided at one end with a wedge shaped jaw $36^a$ arranged to engage the upper ends of the brake band 28 to actuate the same upon the sliding movement of the connection 36. The opposite end of the connection 36 is connected by a suitable link $36^b$ pivoted at $36^c$ to a clutch collar $30^a$ arranged to actuate the clutch 30. Extending within the bore 22 and connected to the clutch collar $30^a$ is a piston valve rod 37 connected to the piston valves 38 and $38^a$ in the bore of the shaft 3. The piston valves 38 and $38^a$ are suitably provided with rings 39 engaging the walls of the bore 6. Likewise the end of the shaft 21 which extends into the center of the gear 23 is provided with a piston ring or other means to prevent the escape of oil lengthwise of said shaft. The piston valves 38 and $38^a$ are arranged to control the passage of fluid from the compression chamber 9 and conduits 10 and its escape to the interior of the casing. To prevent the flow of oil from the cylinder around the control handle the cylindrical wall 33 and the rocker shaft 32 are provided with suitable packing rings $32^a$ located adjacent the end of the shaft and to either side of the upper and lower openings in the cylinder wall. The shaft 21 is provided with suitable packing rings and bearings and the casing is provided with a suitable tap at its lowermost point for convenience in draining the casing.

The operation of the machine is substantially as follows. When the shaft 3 is rotating the cylinders revolve clockwise, Fig. 2. In order to move the transmission shaft 21 in the same direction as the shaft 3 the lever 31 is moved forwardly, to the left in Fig. 1, and the connection 36 is moved to the right, the band 28 is released from the wedging action of the jaws $36^a$ and the clutch jaw members 30 are placed into engagement with the jaw members 29 by the movement of the clutch collar $30^a$ to the left. At the same time the piston valve rod 37 is moved to the left and the piston valve 38 is moved with respect to the ports $6^a$ creating pressure in the cylinders as the pistons are operated. The length of the valve rod 37 is so arranged that the clutch teeth 29 and 30 are in mesh at least slightly before the valve 38 closes the port 6ª and all further movement of the lever 31 and the clutch collar regulates the size of the port 6ª. In order to move the car backward and to rotate the transmission shaft 21 in an opposite direction of that of the shaft 3 the lever 31 is moved rearwardly, to the right in Fig. 1, the connection 36 is moved to the left and the wedge shaped jaws 36ª engage the upper ends of the friction band 28 and cause the latter to grip the annular bearing member 25, holding the member 25 still and the pinions 26 stationary. The power then is transmitted by the gear 23 through the gears 26 to the driven gear 24, the insertion of the intermediate gear 26 causing the gear 24 to rotate in opposite direction. Continued movement of the lever 31 to the right causes the valve 38ª to be moved to the right and close the ports 6ª. When the gear 23 is connected up to the shaft 21 by either of the two methods just mentioned, the eccentric which is keyed to the gear 23, also moves with the shaft 21 or remains stationary according to the status of the shaft 21. The pistons are operated by the eccentric 11 turning within the ring 12 and oil is compressed in the chamber 9 and passageways 10. The movement of the piston valve by the control lever allows for the control of the pressure within the compression chamber 9 and permits the freedom of pumping movement by the pistons. If it is desired to have the shaft 21 rotate at the same rate of speed as the shaft 3 the ports 6 are closed by the valve 38 and the pistons 14 proceed to compress the oil within the chamber 9. Very little time is required to render further pumping impossible and the shaft 21 will be caused to rotate by the shaft 3.

Referring in detail to the structure shown in Fig. 6 it will be noted that the control mechanism is substantially the same. The cylinders, however, are arranged parallel to the axis of the shafts 3 and 21 and instead of being provided with an eccentric ring, the driving gear 23 is rigidly coupled to a cam plate 40 which is annular in design and provided with slotted balls 40ª on its periphery which have a ball and socket connection with the pistons. The revolution of either the shafts 3 or 21 causes the balls 40ª to slide around the plate 40 and to operate the pistons. The fluid is compressed in the chamber 9 and allowed to escape to the interior of the casing by means of a piston valve within the bore of the drive shaft. Corresponding parts in this modification are denoted by similar numerals as those in Fig. 1.

Referring in detail to Fig. 7 it will be noted that the casing 1 is provided with a cylindrical inner wall for part of its length denoted by the numeral 41. In this type of machine the annular casting 7 has an annular rim at the outer ends of the cylinders noted as 42. An annular groove 43 in this rim 42 corresponds with and is in alinement with a similar groove 44 in the cylindrical wall 41. On the pumping action of the pistons fluid is discharged out past the ball valves 45, Fig. 8 into the annular grooves 43 and 44 which constitute a compression chamber. A discharge from this chamber is controlled by means of an oscillating valve 46 which controls the outlet passages 47 to the interior of the main casing and the reservoir. This valve 46 is similar to the design of the rocker shaft leak proof control apparatus described in connection with Fig. 1, the only difference being that openings are provided in the rocker shaft to provide discharge passages for the respective operation of the valve. This type of mechanism is provided with the oil ring members 48 extending around the annular rim 42 to prevent the loss of oil from the compression chamber. Instead of using the pinions for the clutch and driving mechanism as illustrated in Figs. 1 and 6, this form provides a planetary gear arrangement and the operation by the control lever 31 is substantially the same as described for the structure shown in Fig. 1. The ball valve illustrated in Fig. 7 and Fig. 8 is composed of a plurality of plate members having a central opening and adapted to fit over the ball of the valve. As seen in Fig. 8 a coiled spring extends from each plate member and the assembled springs and plate members extend around the cylinders in the compression chamber to retain the ball valves in position.

From the foregoing it will be obvious that the herein described mechanism provides for a simple and efficient substitute for the gear set as used in transmission mechanism. The only working fluid necessary is a light weight machine oil which cannot be lost easily from the casing. Consequently cost of operation is necessarily low. As a transmission mechanism for automobiles it is possible to proceed from a standing position to full speed without the trouble of shifting gears and by the simple movement of a single lever. In climbing hills and in other heavy duty work the speed of the car can be regulated according to the power of the engine and the grade of the hill, avoiding racing or overheating of the engine as well as the necessity of changing gears.

Changes in material, relative size, shape and location of parts may be made without departing from the scope of the invention.

What I claim is:—

1. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rods, an eccentric drive member engaging said annular ring and loosely mounted on said shaft, a primary gear rigidly fastened to said eccentric member, a driven shaft extending into said casing, connecting means between said driven shaft and said gear, and control means including a slidable piston valve within said axial bore arranged to control the passage of fluid from said communicating conduits into said axial bore.

2. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rod, an eccentric drive member engaging said annular ring and loosely mounted on said shaft, a primary gear rigidly fastened to said eccentric member, a secondary shaft extending into said casing and having a central bore in alinement with the bore of said primary shaft, connecting means between said driven shaft and said gear, and unitary control means including a slidable piston valve within said axial bores and operating means for regulating said connecting means, said unitary control means governing the passage of fluid from said communicating conduits into said axial bore.

3. A hydraulic clutch comprising a stationary main casing constituting a combined housing and fluid reservoir, a primary rotatable shaft extending into said casing and provided with an axial bore, a revoluble annular member rigidly mounted on said shaft and comprising a plurality of cylinders and having interconnected fluid compression chambers between said cylinders and in connection with the discharge ports of each cylinder, communicating conduits from said compression chambers to the bore of said primary shaft, pistons within said cylinders, drive means for operating said pistons, and control means including a piston valve within said bore for regulating the passage of fluid from said communicating conduits into said bore.

4. A hydraulic clutch comprising a stationary main casing constituting a combined housing and fluid reservoir, a primary rotatable shaft extending into said casing and provided with an axial bore within the casing, a revoluble annular member within said casing rigidly mounted on said shaft and including a plurality of cylinders radially arranged with respect to said shaft and having inlet and outlet ports, fluid supply scoops attached to said revoluble annular member adjacent said inlet ports, said annular member having communicating conduits between said outlet ports and said axial bore, pistons in said cylinders, connecting rods for said pistons, an annular ring providing bearings for said connecting rod, an eccentric drive member engaging said annular ring and loosely mounted on said shaft, a primary gear rigidly fastened to said eccentric member, a driven shaft extending into said casing, connecting means between said driven shaft and said gear, and control means including a slidable piston valve within said axial bore arranged to control the passage of fluid from said communicating conduits into said axial bore.

5. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rod, an eccentric drive member engaging said annular ring and loosely mounted on said shaft, a primary gear rigidly fastened to said eccentric member, a secondary shaft extending into said casing, a primary clutch element driven by said primary gear, a secondary clutch element connected to said secondary shaft and adapted to engage with said primary clutch element to drive said secondary shaft in the same direction of rotation as that of the primary shaft, and control means including a slidable piston valve within said axial bore arranged to control the passage of fluid from said communicating conduits into said axial bore, said control means constituting unitary means for operating said primary and secondary clutch elements and said valve.

6. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rod, an eccentric drive member engaging said annular ring and loosely mounted on said shaft, a primary gear rigidly fastened to said eccentric member, a secondary shaft extending into said casing and having a central bore in alinement with the bore of said primary shaft, a primary clutch element driven by said primary gear, a secondary clutch element connected to said secondary shaft and adapted to engage with said primary clutch element to drive said secondary shaft, a piston valve within the bore of said primary shaft, a piston valve rod extending from said valve into said bore of said secondary shaft, and unitary control means for regulating said piston valve and the operation of said primary and secondary clutch elements, said piston valve controlling the passage of fluid from said communicating conduits into the bore of said primary shaft.

7. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rod, an eccentric drive member engaging said annular ring and loosely mounted on said shaft, a primary gear rigidly fastened to said eccentric member, a secondary shaft extending into said casing, a secondary gear rigidly fastened to said secondary shaft, an intermediate gear meshing with said primary gear and with said secondary gear, supporting means for said intermediate gear comprising an annular rotatable bearing member, a brake for regulating the rotation of said bearing member, control means for operating said brake, and control means including a slidable piston valve within said axial bore arranged to control the passage of fluid from said communicating conduits into said axial bore.

8. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rod, an eccentric drive member engaging said annular ring and loosely mounted on said shaft, a primary gear rigidly fastened to said eccentric member, a secondary shaft extending into said casing, a secondary gear rigidly fastened to said secondary shaft, an intermediate gear meshing with said primary gear and with said secondary gear, supporting means for said intermediate gear comprising an annular rotatable bearing member, and unitary control means for regulating the rotation of said bearing member and controlling the passage of fluid from said communicating conduits into said axial bore.

9. A hydraulic clutch comprising a stationary main casing constituting a combined housing and fluid reservoir, a primary rotatable shaft extending into said casing and provided with an axial bore within the casing, said bore having a discharge port into said casing, a revoluble annular member within said casing rigidly mounted on said shaft and including a plurality of cylinders radially arranged with respect to said shaft and having inlet and outlet ports and communicating conduits between said outlet ports and said axial bore, pistons in said cylinders, connecting rods for said pistons, an annular ring providing bearings for said connecting rods, an eccentric drive member engaging said annular ring and loosely mounted on said shaft, a primary gear rigidly fastened to said eccentric member, a secondary shaft extending into said casing and having a central bore in alinement with the bore of said primary shaft, a secondary gear rigidly fastened to said secondary shaft, an intermediate gear meshing with said primary gear and with said secondary gear, supporting means for said intermediate gear comprising an annular rotatable bearing member, a brake for regulating the rotation of said bearing member, a piston valve within the bore of said primary shaft, a piston valve rod extending from said valve into said bore of said secondary shaft, and a single unitary control means for regulating the rotation of said bearing member and the movement of said piston valve whereby the passage of fluid from said communicating conduits into said axial bore of said primary shaft is controlled.

10. In combination with a hydraulic clutch, a rotatable member therefor, a primary gear rigidly connected to said rotatable member, a shaft in alinement with said rotatable member, a secondary gear rigidly connected with said shaft, intermediate gears between said primary gear and said secondary gear, a rotatable spider member constituting bearing means for said intermediate gears, a brake for regulating the rotation of said spider, clutch means connected to said spider, secondary clutch means slidably mounted on said shaft and revoluble therewith, and unitary control means for regulating the action of said brake on said rotatable spider and for bringing said secondary clutch means into engagement with said clutch means on said spider, the rotation of said rotatable member and said shaft being in the same direction when said clutch members are in engagement and said spider bearing member is free to rotate, and the direction of rotation being reversed when such clutch members are disengaged and said brake is applied to hold stationary the spider bearing member.

11. In combination with a hydraulic clutch, a rotatable member therefor, a primary gear rigidly connected with said rotatable member, a shaft in alinement with said rotatable member, a secondary gear rigidly connected to said shaft, intermediate gears between said primary gear and said secondary gear, a rotatable spider member constituting bearing means for said intermediate gears, a brake for controlling the rotation of said spider, clutch means connected to said spider, secondary clutch means slidably mounted on said shaft and revoluble therewith, a valve for controlling the operation of said hydraulic clutch, and unitary control means for regulating the movement of said valve, for regulating the action of said brake on said rotatable spider and for bringing said secondary clutch means into engagement with the clutch means on said spider, the rotation of said rotatable member and said shaft being in the same direction when said clutch members are in engagement and said spider bearing member is free to rotate and the direction of rotation being opposite when said clutch members are disengaged and said spider bearing member is held stationary by the application of said brake.

12. In combination with a hydraulic clutch, a combined casing and fluid reservoir, axially alined rotatable members, gears within said casing and rigidly keyed to said rotatable members, intermediate gears between said gears on said rotatable members, a revoluble bearing member rotatably mounted within said casing and supporting said intermediate gears and having a circular peripheral braking surface, a friction brake within said casing and inclosing said bearing member and adapted to engage said braking surface, a support for said brake rigidly connected to the interior of said casing, and control means for actuating said brake extending from the interior of said casing to the exterior thereof.

13. In a hydraulic clutch, the combination of a stationary casing constituting a combined housing and fluid reservoir, a hydraulic pump within said casing, a control valve for said pump, a primary rotary driven element connected to said pump, a primary gear fastened to said primary driven element, a shaft extending into said casing, a secondary gear rigidly fastened to said shaft, an intermediate gear in mesh with said primary gear and with said secondary gear, supporting means for said intermediate gear comprising an annual rotatable bearing member, a brake for regulating the rotation of said bearing member, and unitary control means for regulating the rotation of said bearing member and the control valve of said pump.

14. In combination with a hydraulic clutch, a combined casing and fluid reservoir, and a control handle and valve mounted on said casing and extending to the interior of the same comprising a cylinder, an oscillating piston within said cylinder, piston rings on said piston adjacent the ends thereof and in engagement with the walls of said cylinder, said cylinder having openings at opposite sides thereof near its middle portion, an arm projecting from said piston through one of said openings into the interior of said casing for actuating apparatus therein, and an operating handle extending through the opposite opening whereby the piston is oscillated, said piston rings preventing the escape of fluid from the interior of said casing when said piston is actuated.

In testimony whereof I have hereunto set my hand in presence of two subscribing witnesses.

JOB HUTCHINSON.

Witnesses:
ALFRED URBAN,
R. RANDEL WANGEMAN.